United States Patent [19]

Shigeta et al.

[11] Patent Number: 4,580,337
[45] Date of Patent: Apr. 8, 1986

[54] PROCESS FOR PRODUCING ELECTRODE SUBSTRATE FOR FUEL CELLS

[75] Inventors: Masatomo Shigeta; Hiroyuki Fukuda, both of Iwaki; Kuniyuki Saitoh, Abiko; Hisatsugu Kaji, Iwaki, all of Japan

[73] Assignee: Kureha Kagaku Kogyo Kabushiki Kaisha, Tokyo, Japan

[21] Appl. No.: 712,655

[22] Filed: Mar. 18, 1985

Related U.S. Application Data

[63] Continuation-in-part of Ser. No. 535,913, Sep. 26, 1983, Pat. No. 4,522,895.

[30] Foreign Application Priority Data

| Oct. 5, 1982 [JP] | Japan | 57-174960 |
| Oct. 12, 1982 [JP] | Japan | 57-178770 |
| Nov. 24, 1982 [JP] | Japan | 57-205628 |
| Mar. 23, 1984 [JP] | Japan | 57-55590 |
| Mar. 23, 1984 [JP] | Japan | 57-55591 |

[51] Int. Cl.$^4$ .............................................. H01M 4/96
[52] U.S. Cl. ................................. 29/623.1; 429/34; 429/209; 429/72; 264/105; 403/DIG. 5
[58] Field of Search ............... 29/623.1; 264/104, 105, 264/154; 403/DIG. 5; 252/502, 511; 429/40–45, 209, 34; 204/294

[56] References Cited

U.S. PATENT DOCUMENTS

| 2,860,175 | 11/1958 | Justi | 429/45 |
| 3,342,643 | 9/1967 | Bihan | 429/45 |
| 3,511,714 | 5/1970 | Bocciarelli | 429/34 |
| 3,578,502 | 5/1971 | Tannenberger et al. | 429/44 |
| 4,292,379 | 9/1981 | Kothmann | 429/34 X |
| 4,377,033 | 3/1983 | Barnes et al. | 29/623.1 |
| 4,500,395 | 2/1985 | Nakamura | 429/44 X |

*Primary Examiner*—Anthony Skapars
*Attorney, Agent, or Firm*—Oblon, Fisher, Spivak, McClelland & Maier

[57] ABSTRACT

Disclosed herein is a process for producing a carbonaceous electrode substrate for use in fuel cells, comprising two layers of a porous carbonaceous layer and a compact carbonaceous layer or three layers of two porous carbonaceous layers and a compact carbonaceous layer disposed between the two porous carbonaceous layers, wherein the porous carbonaceous layer(s) has elongated holes located nearly in the central region of thickness thereof, characterized by using high polymeric substance as a material for forming said elongated holes.

8 Claims, 4 Drawing Figures

PROCESS FOR PRODUCING ELECTRODE SUBSTRATE FOR FUEL CELLS

CROSS-REFERENCE TO RELATED APPLICATION

The present application is a continuation-in-part of U.S. patent application Ser. No. 535,913 filed on Sept. 26, 1983 now Pat. No. 4,522,895.

BACKGROUND OF THE INVENTION

The present invention relates to a process for producing a carbonaceous electrode substrate for use in fuel cells comprising two layers of a porous carbonaceous layer and a compact carbonaceous layer or three layers of two porous carbonaceous layers and a compact carbonaceous layer disposed between said two porous carbonaceous layers, wherein said porous carbonaceous layer(s) has elongated holes located nearly in the central region of thickness thereof, characterized by using high polymeric substance as a material for forming said elongated holes.

Hitherto, fuel cells of bipolar-separator type using bipolar-separators obtained by subjecting impermeable graphitic thin plates to rib-working have been known.

On the other hand, electrode substrates of monopolar-type have come to be developed, wherein the one surface of the electrode substrate is provided with ribs and the opposite surface thereof is flat. In a cell formed by such electrode substrates, the gaseous reactant (oxygen or hydrogen) diffuses from the ribbed surface through the substrate to the flat opposite surface.

Of the attached drawings,

FIG. 1 is a perspective view of a fuel cell unit structure of a conventional monopolar-type fuel cell;

FIG. 2-a shows an outline of a cloth-like fabric used for the elongated holes in the present invention;

FIG. 2-b shows an outline of a grating-like molding used for the elongated holes in the present invention;

FIG. 3 is a perspective view of a part of a fuel cell unit structure including an electrode substrate consisting of two layers according to the present invention; and FIG. 4 is a perspective view of a bipolar-type cell unit structure including an electrode substrate consisting of three layers according to the present invention Namely, the fuel cell unit using the electrode substrate of monopolar-type, as is seen in FIG. 1, comprises two electrode substrates 1' having ribs 5 on one side thereof; two catalyst layers 2; one matrix (impregnated with the electrolyte) 3 and two separator sheets 4, the gaseous reactant (oxygen or hydrogen) diffusing from the ribbed surface of the electrode substrate 1' through thereof to the flat surface of the electrode substrate when the electrode substrates are applied in a fuel cell.

Hitherto, as a process for producing electrode substrates for use in a fuel cell of monopolar type, a process of press-molding the material based on short carbon fibers (refer to Japanese Patent Application Laying-Open No. 58-117649), a paper-making-like process using a dispersion of carbon fibers (refer to Japanese Patent Publication No. 53-18603) and a process of chemical vapor deposition of carbon formed by thermal decomposition of hydrocarbons onto a web of carbon fiber (refer to U.S. Pat. No. 3,829,327) have been proposed.

The electrode substrate obtained by any of the thus proposed processes consists, as a whole, of one layer of a uniform structure. In the case where the bulk density of the uniform and single-layered electrode substrate is large, the limiting current density of a fuel cell provided with such electrode substrates is small due to the small diffusion coefficient of the gaseous reactant, and the performance of the electrode substrate is reduced in a short time period of operation due to the insufficient amount of the electrolyte therewithin, thereby resulting in a demerit of being short in life.

On the other hand, in the case where the bulk density of the uniform, single-layered electrode substrate is small, there are demerits due to increase in electric- and thermal resistance and decrease in mechanical strength, for instance, bending strength.

In addition, in the case of an electrode substrate having a ribbed structure, the upper surface of the electrode substrate 1' is not flat as is seen in FIG. 1, resulting in focussing the stresses onto the sharp edge parts 6 at the base part of the ribs 5. Namely, there is an unreliable point in the strength of such an electrode substrate.

Therefore, in order to retain the strength of the electrode substrate as a molded plate, there is no method but to enlarge the thickness of the flat part of the electrode substrate resulting in the defect of the enlarged resistance to the diffusion of the gases (oxygen or hydrogen) through the whole thickness of the electrode substrate from the ribbed side to the flat side.

In addition, it is difficult to finish the top part of the ribs with complete flat, and as a result, the electric- and thermal contact resistance between the separator and the electrode substrate becomes too large not to be disregarded. Such a contact resistance is several times as large as the transfer resistance within the electrode substrate and therefore, in the conventional monopolar-electrode substrate, the contact resistance is so large that there is a possibility of causing un-uniformity of the temperatures within the cell and reduction of electrogenerating efficiency.

The object of the present invention is to provide a process for producing an electrode substrate for use in fuel cells, which solves the above-mentioned demerits of the conventional electrode substrates.

Namely, the present invention offers a process for producing a carbonaceous electrode substrate of fuel cells, which comprises two layers of one porous carbonaceous layer and one compact carbonaceous layer or three layers of two porous carbonaceous layers and one compact carbonaceous layer disposed between the two porous carbonaceous layers and wherein the porous carbonaceous layer(s) has elongated holes having a equivalent diameter of 0.5–3 mm in which the elongated holes are located nearly in the central region of thickness of the each porous carbonaceous layer, and parallel to each other and the upper- and lower surfaces thereof.

The characteristic feature of the process according to the present invention lies in the use of a cloth-like fabric or a grating-like molding made of a high polymeric substance as a material for forming the elongated holes.

The elongated holes within the porous carbonaceous layer of the carbonaceous electrode substrate of the present invention act as the passage of the gaseous reactant when the electrode substrate is applied in fuel cells, and the passage of the gaseous reactant has been disclosed in Japanese Patent Publication No. 36-6123, however, the method of forming such holes by integral-molding in the production of the electrode substrate is not disclosed in the Published Patent.

SUMMARY OF THE INVENTION

In an aspect of the present invention, there is provided a process for producing a carbonaceous electrode substrate for use in fuel cells which consists of two layers of one porous carbonaceous layer and one compact carbonaceous layer or three layers of two porous carbonaceous layers and one compact carbonaceous layer disposed between the two porous carbonaceous layers, wherein the porous carbonaceous layer(s) has elongated holes located nearly in the central region of thickness thereof, characterized by using high polymeric substance as a material for forming said elongated holes.

DETAILED DESCRIPTION OF THE INVENTION

The material used in the present invention as the material for forming the elongated holes within the porous carbonaceous layer is a high polymeric substance in a shape of cloth-like fabric or a grating-like molding.

As the high polymeric substance, a substance of a carbonization yield (900° C.) of less than 30% by weight is suitably selected from the group consisting of polyethylene polypropylene, polystyrene, polyvinylalcohol and polyvinylchloride. In the case of using the high polymeric substance of the carbonization yield of over 30% by weight, there is a fear of causing difficulty in forming the holes and in regulating the equivalent diameter thereof. Furthermore, of the high polymeric substances thus selected, a substance which does not show any volatilization nor melt-flow at a temperature of 100° C. should be used. Namely, the thermal deformation of the high polymeric substance at the temperature and the pressure of molding is allowable, however, the substance should not volatilize nor show melt-flow at the temperature and the pressure.

Figure 2A:
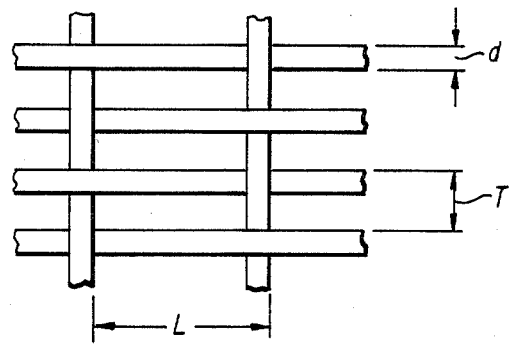
Figure 2B:
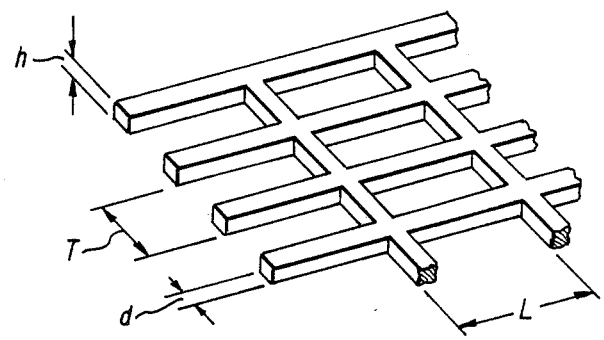

The cloth-like fabric which is used for forming the hole having an equivalent-diameter of 0.5 to 3.0 mm within the porous carbonaceous layer of the present invention is prepared by weaving a single fiber of from 0.5 to 3.3 mm in diameter (d) made of the high polymeric substance or a bundle of from 0.5 to 3.3 mm in diameter (d) composed of a plurality of the single fibers at a distance (T) of from 1.5 to 5 mm in the direction parallel to the gas flow and at a distance (L) of from 1.5 to 50 mm in the direction perpendicular to the gas flow (refer to FIG. 2).

The grating-like molding made of the high polymeric substance and used as the same purpose as above is prepared by (1) extrusion-molding of the molten high polymeric substance into a metal mold or (2) press-molding of pellets or powder of the high polymeric substance in a metal mold. The cross-section of the thus prepared grating-like molding may be an optional form such as circular-, rectangular-, square- or star-like form. Although the cross-sectional area of the grating-like molding is selected so that the diameter of an imaginary circle having the same area as the perpendicular cross-sectional area of a frame of the grating-like molding (hereinafter referred to as the equivalent diameter of the cross-section of the grating-like molding) is in a range of 0.5 to 3.3 mm, in the case where the cross-section of the frame is rectangular in shape, as shown in FIG. 2-b, the length (d) of one of the sides of the rectangle and that (h) of the other thereof are selected from the ranges of 0.45 to 2.7 mm and of 0.5 to 3.0 mm, respectively so that the equivalent diameter of the cross-section of the grating-like molding is in the range of 0.5 to 3.3 mm. The distance (T) between the adjoining two frames of the grating-like molding parallel to the gas flow is selected to be in the range of 1.5 to 5 mm, and that (L) between the adjoining two frames of the grating-like molding perpendicular to the gas flow is selected to be in the range of 1.5 to 50 mm corresponding to the purpose.

The cloth-like fabric or the grating-like molding may be placed within the material in the metal mold for producing the porous carbonaceous layer so that the fabric or the molding situates nearly in the central region of the thickness of the porous carbonaceous layer and then the material for the porous carbonaceous layer is molded by pressure together with the cloth-like fabric or the grating-like molding and subjected to after-hardening. The thus hardened material holding the cloth-like fabric or the grating-like molding is subjected to carbonization and calcination to thermal-decompose a larger part of the high polymeric substance to be dissipated as a gaseous substance except for the small part to be carbonized, thereby forming the elongated holes within the porous carbonaceous layer.

Generally, it has been confirmed that in the case of forming the elongated holes by the above-mentioned method, the equivalent diameter of the thus formed elongated hole when the whole material is cooled to an ordinary temperature after carbonization and calcination thereof is smaller than the diameter of the original fiber or the equivalent diameter of the grating-like molding by from 3 to 7%, and accordingly, in considering the reduction of the diameter, the diameter of the fiber or the equivalent diameter of a frame of the grating-like molding is selected, thereby optionally regulating the equivalent diameter of the thus formed elongated hole to a preferable size.

The carbonaceous electrode substrate for use in a fuel cell according to the present invention is produced as follows while using the above-mentioned material for forming the elongated holes.

Namely, in the case of producing the electrode substrate comprising two layers of one porous carbonaceous layer and one compact carbonaceous layer, (1) a mixture for producing the porous carbonaceous layer comprising 10 to 50% by weight of a filling material, 20 to 40% by weight of a binding material and 20 to 50% by weight of a micropore-regulating material, (2) the high polymeric substance for forming the elongated holes, (3) the above mixture for producing the porous carbonaceous layer and (4) a material for producing the compact carbonaceous layer are supplied into a metal mold in the order, the thus supplied materials are press-molded, and the thus obtained press-molded materials are subjected to precalcination, and then only the compact carbonaceous layer of the thus obtained pre-calcinated materials is impregnated with liquid phenol. The thus obtained material is repeatedly subjected to the above pre-calcinating and impregnating treatment until a desired compact property thereof is obtained, and then the thus treated material is subjected to calcination after after-hardening thereof thereby obtaining the electrode substrate comprising two layers of one porous carbonaceous layer and one compact carbonaceous layer.

On the other hand, in the case of producing the electrode substrate comprising three layers of two porous carbonaceous layers and one compact carbonaceous layer, (1) a mixture for producing the porous carbonaceous layer comprising 10 to 50% by weight of a filling material, 20 to 40% by weight of a binding material and 20 to 50% by weight of a micropore-regulating material, (2) the high polymeric substance for forming the elongated holes, (3) the above mixture for producing the porous carbonaceous layer, (4) a material for the compact carbonaceous layer, (5) the mixture for producing the porous carbonaceous layer, (6) the high polymeric substance for forming the elongated holes and finally, (7) the mixture for producing the porous carbonaceous layer are supplied into a metal mold in the order, the thus supplied materials are press-molded, and the thus obtained press-molded materials are subjected to after-hardening, and the thus hardened materials are subjected to calcination thereby obtaining the electrode substrate comprising three layers.

As the filling material for producing the porous carbonaceous layer, short carbon fiber, granular activated carbon and the like may be used. As the binding material thereof, phenol resin, epoxy resin, furfuryl alcohol resin, petroleum pitch and/or coal pitch, or mixtures thereof may be used and as the micropore-regulating material, polyvinylalcohol, polyvinylchloride, polystyrene, polyethylene, polypropylene, sucrose and mixture thereof may be used.

As the short carbon fiber used as the filling material, that of 5 to 30 micrometers in diameter and of 0.05 to 2 mm in length is preferable. The fibers of over 2 mm in length get interwined between themselves in the step before molding to be fiber-ball and accordingly, the desired bulk density of and the desired distribution of micropore diameter in the porous carbonaceous layer are not available. On the other hand, in the case where the length of the fibers is below 0.05 mm, the necessitated strength of the product is not available.

In addition, the rate of linear contraction of the short carbon fiber when it is calcined at 2000° C. should be not more than 3.0%. In the case of using short carbon fibers which contract over 3.0% linearly at 2000° C., there is a fear of causing cracks in the product during the step of calcination.

By using the short carbon fibers of the above-mentioned dimensions and the rate of linear contraction according to the present invention, it is possible to produce particularly large electrode substrates.

The binding material for the porous carbonaceous layer in the present invention is useful for binding the carbon fibers after carbonization, and in order to obtain the porous carbonaceous layer of a desired bulk density, it is desirable that the binding material is a resin of a carbonization yield (900° C.) of from 30 to 75% by weight. As such a binding material, phenol resin, epoxy resin, furfuryl alcohol resin, pitch derived from petroleum and/or coal and mixtures thereof may be mentioned. Particularly, powdery phenol resin or a mixture thereof with a powdery pitch is most preferable in the case of dry blending the starting materials and that the specific properties of the thus obtained porous carbonaceous layer are excellent. The binding material is used in an amount of 10 to 50% by weight of the mixture of the starting materials, preferably 20 to 40% by weight thereof. In the case where the amount is below 10% by weight, the porous carbonaceous layer obtained is low in mechanical strength due to the insufficiency of the amount of the binding material, and on the other hand, in the case of the amount of over 50% by weight, it is impossible to obtain the product having the desired micropore-diameter and permeability of the gaseous reactant.

The micropore-regulating material used in the present invention is an important material for determining the micropores of the molded material of the porous carbonaceous layer. In the process according to the present invention, an organic granular substance of which more than 70% by weight are the granules of a diameter in the range of from 30 micrometers to 300 micrometers and which does not volatilize nor shows any melt-flow at a temperature of 100° C., is used to regulate the bulk density and micro-pore diameter thereof.

Namely, the organic granular substance may show thermal deformation at the temperature and the pressure of molding the mixture of raw materials for producing the electrode substrate of the present invention, however, it should not volatilize nor show any melt-flow under the above conditions.

In consideration of the above-mentioned requirements, as the preferable micropore-regulator, a substance of a carbonization yield of less than 30% by weight is selected suitably from the group consisting of polyvinylalcohol, polyvinylchloride, polyethylene, polypropylene, polystyrene, sucrose and mixtures thereof. In the case of using a substance of a carbonization yield of over 30% by weight, there is a fear of causing difficulty in regulating the bulk density and micropore diameter of the thus obtained porous carbonaceous layer.

The amount of the micropore-regulating material is selected in the range of from 20 to 50% by weight of the mixture of raw materials for producing the porous carbonaceous layer of the present invention in line with the desired bulk density and micropore diameter thereof. In addition, in the cases of blending the filling material (A % by weight of the blended mixture), the binding material (B % by weight of the blended mixture) and the micropore regulating material (C % by weight of the blended mixture), a desirable result is obtained by regulating the amounts of the respective components so that $(A+C)/B$ is in the range of 1.5 to 4.0. In the case where $(A+C)/B$ is not in the above-mentioned range, it is difficult to obtain the porous carbonaceous layer of which the bulk density, the bending strength, the gas-permeability (to oxygen and hydrogen) and electric resistance are satisfactory. More in detail, in the present invention, in the case where A is selected in the range of from 10 to 50 and also C is selected in the range of from 20 to 50, it is preferable to select B in the range of from 20 to 40.

For producing the above compact carbonaceous layer, a method of using a carbon plate or a compressed graphite paper (graphite sheet), or a method of integral-molding a powdery mixture of 0 to 80% by weight of short carbon fibers, 0 to 80% by weight of a fine powdery precurser of carbon (refer to Japanese Patent Publication No. 53-31116), 10–40% by weight of a binding material such as phenol resin, etc., and 0–40% by weight of micro-granules of activated carbon is available. In addition, on integral-molding the above powdery mixture, in the case of using over 40% by weight of phenol resin there is a trouble in the molding of the mixture due to the overflow of the excess phenol resin, and in the case of using below 10% by weight of the resin the desired bulk density and gas permeability of the compact carbonaceous layer can not be obtained due to the insufficient amount of the binding material resulting in lowering the strength of the product.

Molding of the blended mixture of the raw materials for producing the electrode substrate of the present invention is carried out by a conventional press-molding as follows.

In the case of producing the electrode substrate comprising two layers, (1) the mixture for producing the porous carbonaceous layer, (2) the high polymeric substance for forming the elongated holes, (3) the mixture for producing the porous carbonaceous layer, and (4) the material for producing the compact carbonaceous layer are supplied into a metal mold in the order, and in the case of producing the electrode substrate comprising three layers, in addition to the above four supplied materials, (5) the mixture for producing the porous carbonaceous layer, (6) the high polymeric substance for forming the elongated holes and (7) the mixture for producing the porous carbonaceous layer are supplied into a metal mold for press-molding in the order.

The press-molding is respectively carried out on the thus supplied materials for producing the electrode substrate comprising two layers or three layers at a metal mold temperature of 70° to 170° C., under a molding pressure of 5 to 100 kg/cm$^2$ for 1 to 60 min.

The process in the next step for producing the electrode substrate comprising two layers of one porous carbonaceous layer and one compact carbonaceous layer from the above press-molded material is as follows.

After finishing the press-molding, the thus obtained molded material is once subjected to pre-calcination in an inert atmosphere at 800° C. for about 1 hr. In this step, it is preferable to raise the temperature slowly, for instance, at a rate of 100°±50° C./hour up to 700° C. for preventing the occurrence of a stress due to the rapid contraction of the material as a result of the gasification of some components of the starting materials.

In the case where the temperature is too rapidly raised in the above thermal decomposition, interlayer exfoliation and occurrence of cracks are caused in the product.

Then, only the part of the compact carbonaceous layer of the obtained material by pre-calcinating at 800° C. is impregnated with liquid phenol resin obtained by dissolving phenol resin in a solvent such as alcohols which can dissolve phenol resin, and then the impregnated material is further pre-calcinating treatments are carried out repeatedly to obtain a desired compact property of the product.

After finishing the above impregnating and precalcinating treatments, the thus obtained material is afterhardened at a temperature of the molding for at least 2 hours without pressing and the thus hardened material is calcinated at 800°–3000° C. for about 1 hour to obtain the electrode substrate comprising two layers of the porous carbonaceous layer and the compact carbonaceous layer.

On the other hand, the process in the next step for producing the electrode substrate comprising three layers of two porous carbonaceous layers and one compact carbonaceous layer from the above press-molded material is also as follows.

After finishing the press-molding, the thus obtained molded material is after-hardening at the molding temperature for at least 2 hours, and the thus hardened material was subjected to calcinating in an inert atmosphere for about one hour at a temperature of from 800° to 3000° C. In the step of the thermal decomposition of the molding at a low temperature, it is preferable to raise the temperature slowly, for instance, at a rate of 100°±50° C./hour up to about 700° C. for preventing the occurrence of a stress due to the rapid contraction of the material as a result of the gasification of some components of the starting materials.

In the case where the calcinating temperature is too rapidly raised in the above step of thermal decomposition, interlayer exfoliation and occurrence of cracks are caused in the product.

The each carbonaceous electrode substrate produced by the above-mentioned processes is high in mechanical strength thereof, for instance, in bending strength, and can be obtained at a thin plate which has a thin diffusion layer of the gaseous reactant.

Accordingly, in the case of applying the thus obtained each electrode substrate in a fuel cell, the resistance to the diffusion of the gaseous reactant is small and the current density thereof is large enough.

The carbonaceous electrode substrates for use in fuel cell, produced according to the process of the present invention are explained more in detail as follows.

Figure 3:
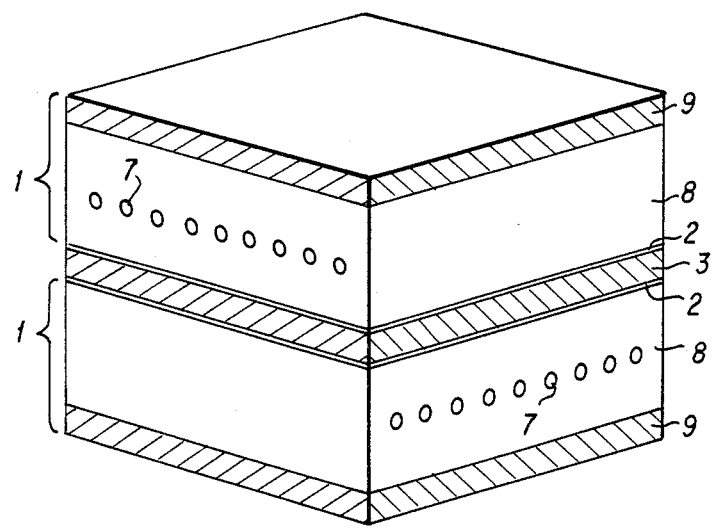
Figure 4:
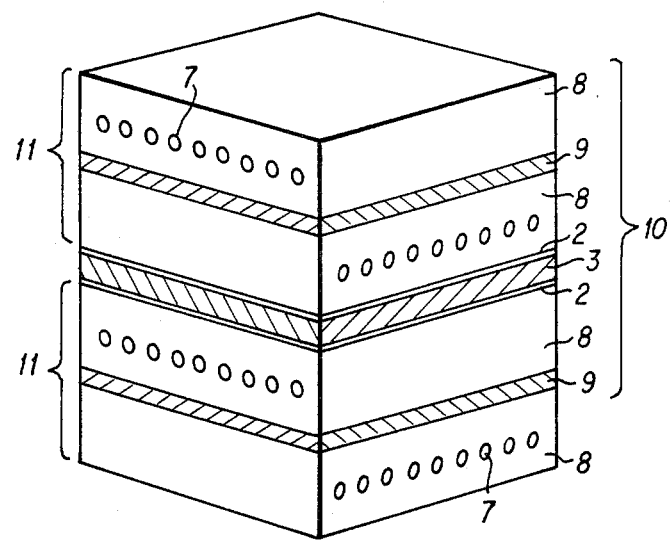

In FIG. 3 and FIG. 4, the fuel cell unit using the electrode substrate according to the present invention are illustrated. The electrode substrate of two layers according to the present invention comprises the porous carbonaceous layer 8 and the compact carbonaceous layer 9.

As seen from FIG. 3, the electrode substrate 1 is provided with elongated holes 7 located nearly in the central region of the thickness of the porous carbonaceous layer 8.

The elongated holes according to the present invention are continued from the opening in the one side surface to the opening in the opposite side surface, and the elongated holes are parallel to each other, to the electrode surface and the both side surfaces (not having the opening of the elongated hole) of the electrode substrate.

Figure 1:
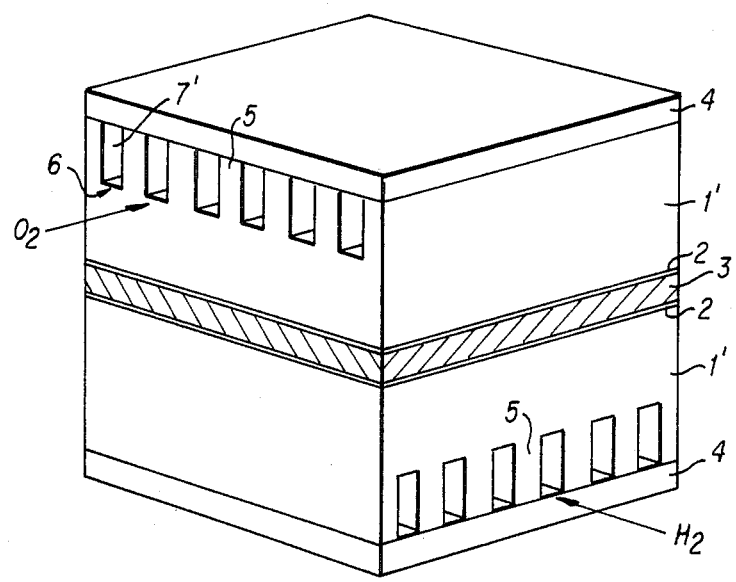

In FIG. 4, the bipolar-type fuel cell unit according to present invention is illustrated as a piled form of two electric substrates 11 holding catalyst layer 2 and matrix layer 3, and a part designated by 10 in FIG. 4 corresponds to a fuel cell unit in FIG. 1.

Electrode substrate 11 comprises three layers obtained by integral-molding a compact carbonaceous layer 9 and two porous carbonaceous layers 8 facing to the both surfaces of the compact carbonaceous layer 9. The two porous carbonaceous layers 8 of the electrode substrate 11 are provided with elongated holes 7 located preferably in the central region of the thickness of the each porous carbonaceous layer. The each groups of the elongated holes 7 are perpendicular in the directions to each other while holding the compact carbonaceous layer 9 (refer to FIG. 4).

The shape of the cross-section of the elongated hole 7 may be optional, for instance, may be circular as are seen in FIG. 3 and FIG. 4. The equivalent diameter of the elongated hole is preferably in a range of 0.5 to 3 mm, and in the case where the elongated holes of the equivalent diameter of below 0.5 mm are formed in an electrode substrate of a larger area, the resistance to diffusion of the gaseous reactant becomes too large because of the small diameter and the long span of the holes through the porous carbonaceous layer. On the other hand, in the case where the equivalent diameter is over 3 mm, the thickness of the porous carbonaceous layer becomes too large, thereby reducing the volumetric generating efficiency of the cell prepared by piling the electrode substrates.

The each porous carbonaceous layer 8 in the electrode substrates 1 and 11 according to the present invention comprises an uniform, porous carbonaceous material of an average bulk density of 0.3 to 1.0 g/cm$^3$, preferably from 0.4 to 0.8 g/cm$^3$ and a preferable rate of gas permeation of higher than 20 ml/cm·hour·mmAq. The porous carbonaceous layer showing the average bulk density and the rate of gas permeation shows a preferable mechanical strength, for instance, bending strength, and a preferable low resistance to diffusion of the gaseous reactant.

In addition, the micropores in the porous carbonaceous layer are opened to a whole surface thereof, and it is preferable that more than 60% by volume of the micropores have a diameter in a range of from 10 to 100 micrometers.

The each compact carbonaceous layer 9 in the electrode substrate 1 and 11 according to the present invention is preferably more than 1.0 g/cm$^3$ in average bulk density thereof and less than 0.2 ml/cm·hr·mmAq. in gas permeability coefficient thereof. In the case where the average bulk density of the compact carbonaceous layer 9 is less than 1.0 g/cm$^3$, a desired compact property is not obtained. In addition, the compact carbonaceous layer 9 acts also as a separator sheet (4 in FIG. 1) due to the low degree of gas permeability thereof, but in the case where the gas permeability coefficient is more than 0.2 ml/cm·hr·mmAq. it does not act as the separator sheet. Then, the thickness of the compact carbonaceous layer 9 is preferably less than one half of the total thickness of the electrode substrate. The thickness of the compact carbonaceous layer in the electrode substrate 11 is more preferably in the range of 0.1–3 mm.

The electrode substrate according to the present invention has a large mechanical strength such as bending strength compared with the conventional ribbed electrode substrate in the same thickness thereof, because of the location of the elongated holes near the central region of the thickness of the porous carbonaceous layer and the presence of the compact carbonaceous layer. Accordingly, the total thickness of the electrode substrate of present invention can be reduced compared with that of the conventional electrode substrate. As a result, there are merits of having a thinner gas diffusion layer and therefore, a lower resistance to diffusion of gases, thereby exhibiting a large current density of a fuel cell. In addition, the compact carbonaceous layer therein acts also as a separator sheet resulting in the reduction of the cost and the absence of the contact resistance thereof due to the unnecessity of using the conventional independent separator sheet therein. As a result, it is expected that in the case of piling the electrode substrates the total electric resistance of the whole fuel cell is reduced considerably. Thus, the electrode substrate according to the present invention may be said to be an ideal one.

In this connection, as compared to the electrode substrate of carbon fiber-paper type produced by a papermaking process, the electrode substrate according to the present invention has a larger bending strength and it is not necessary to be ribbed. Accordingly cost-reduction and reduction of electric resistance are expected in the electrode substrate according to the present invention.

In addition, since the elongated holes can be formed by integral-molding in the molding of the electrode substrate, there is an effect of simplifying the production steps.

In order to show further the excellent specific properties of the electrode substrate produced according to the present invention, the values of the specific properties of an example of the electrode substrates of the present invention are compared with those of an example of the conventional electrode substrates of monopolar-type provided with ribs (refer to FIG. 1), determined under the same conditions, in Table 1.

TABLE 1

| | Conventional method | Present invention two layers construction | Present invention three layers construction |
|---|---|---|---|
| Thickness of an electrode substrate (mm) | 2.4 | 2.0[1] | 3.6[2] |
| Thickness of an unit cell (mm) | 5.8[3] | 4.5[4] | 4.1[5] |
| Bending strength of an electrode substrate (kg/cm$^2$) | 100 | 250 | 250 |
| Compression strength of an electrode substrate (kg/cm$^2$) | 100 | 110 | 110 |
| Electric resistance (mΩ/cm$^2$) electrode substrate | 8 | 6 | 10 |
| contact resistance[6] | 30 | 20 | — |
| a whole cell | 77[7] | 32 | 10 |
| Thickness of gas-diffusion layer (mm) | 1.2 | 0.5 | 0.5 |
| Limiting current density (mA/cm$^2$) | 400 | 500 | 500 |
| Generated output/vol[8] (kw/m$^3$) | 207 | 267 | 298 |

Note:
[1] An electrode substrate comprises two layers of one porous carbonaceous layer and one compact carbonaceous layer
[2] An electrode substrate comprises three layers of two porous carbonaceous layers (respectively 1.5 mm) and one compact carbonaceous layer (0.6 mm).
[3] A unit cell comprises a separator sheet (0.5 mm), an electrode substrate, an electrolyte layer (thickness 0.5 mm, a matrix and two catalyst sheets) and another electrode substrate.
[4] A unit cell comprises an electrode substrate, an electrolyte layer (same as the above 3) and another electrode substrate.
[5] A unit cell comprises an electrode substrate (3.6 mm) and an electrolyte layer (same as the above 3).
[6] Total sum of contact resistances under a contact pressure of 1 kg/cm$^2$.
[7] Sum of the resistances of separator sheet (1 mΩ) and two electrode substrates and the contact resistances between the electrode substrates and the separator sheets.
[8] at 200 mA/cm$^2$.

The present invention will be illustrated while referring to the following non-limiting Example. It will be understood that various modifications may be carried out by those skilled in the art without difficulty and those variations will be included in the present invention.

In the Example, the "porosity P (%)" was determined by the following equation while assuming that the real density of a carbonaceous substrate was 1.6 g/cm$^3$;

$$p = (1 - \rho_b/1.6) \times 100$$

wherein $\rho_b$ was the measured bulk density (g/cm$^3$) of a specimen, the "bending strength (kg/cm$^2$)" of a porous carbonaceous electrode substrate was determined according to Japanese Industrial Standards (JIS) K-6911/1970 while using a specimen with a dimension of 100×10×2.5 mm, and the "average diameter of micropores (μm)" of a specimen was measured by a mercury porosimeter (manufactured by Carlo Erba Strumentazione, Italia). The "gas permeability coefficient $Q_s$ (ml/cm.hr.mmAq.)" was determined in the following manner: a cylindrical specimen of 90 mm in diameter and t mm in thickness was cut out from a substrate to be measured, the circumferential side surface of the specimen was treated with a thermosetting resin so that gas might not permeate therethrough, both longitudinal end surfaces of the specimen were then put between two cylindrical gas tubes with flange holding a gasket, a predetermined amount (10 l/min) of air was supplied from one end of the specimen to the other end thereof which was open to the atmosphere, the pressure loss between two ends of the specimen was measured by a manometer attached to the upstream of the gas tube and the specific gas permeability $Q_s$ was then calculated by the following equation;

$$Q_s = \frac{6 \times t \times 10^4}{50.24 \times \Delta p}$$

wherein $\Delta p$ was the measured pressure loss (mmAq.) and 50.24 cm$^2$ was a real area to be measured (a circle of 80 mm in diameter). Further, the "electric resistance $\rho_V$ ($\Omega$cm)" determined in the following manner: both ends of a specimen were coated with an electroconductive coating material and an electrical resistance between two ends of the specimen was measured according to SRIS (Standards of Japan Rubber Association) 2301-1969, and then the volume resistivity was calculated by the following equation;

$$\rho_V = R \cdot w \cdot t / l$$

wherein R was the measured resistance ($\Omega$) between the ends of the specimen, 1 (cm) was a longitudinal length (direction to be measured), and w (cm) and t (cm) were a horizontal and a vertical lengths, respectively, defining a cross section of the specimen.

EXAMPLE 1

Preparation of a Grating-like Molding of Polypropylene

A grating-like molding of polypropylene with a shape as shown in FIG. 2-b (for forming the elongated holes) was prepared by melt-extruding commercialized pellet-like polypropylene (Model J-215, made by Ton-en-Petroleum Co., Ltd.) at 230° C. under an injecting pressure of 500 kg/cm$^2$ while using a screw-type injection molding machine into a metal mold kept at about 50° C. The metal mold had been made by providing channel which give the following dimensions to the thus molded grating-like molding on a stainless-steel plate and the metal mold was provided with a separable covering plate of stainless-steel:

(1) d=1 mm, (2) h=1 mm, (3) T=2.5 mm and (4) L=40 mm.

EXAMPLE 2

Production of an Electrode Substrate Comprising Two Layers (1) A mixture for producing the porous carbonaceous layer comprising 40% by weight of short carbon fibers of 14 micrometers in an average diameter and 0.4 mm in an average length (Model M 104 S, made by Kureha Kagaku Kogyo Co., Ltd.), 30% by weight of granules of polyvinylalcohol of 180 micrometers in an average diameter (made by Nippon Gosei Kagaku Co., Ltd.) as a micro-pore regulating material, and 30% by weight of phenol resin (made by Asahi Yukizai K.K.), (2) the material for forming elongated holes (the grate-like molding of polypropylene prepared in Example 1), and (3) the above mixture for producing the porous carbonaceous layer were supplied into a metal mold for press-molding in the order and then, (4) a mixture for producing the compact carbonaceous layer comprising 20% by weight of short carbon fibers (Model M 104 S, made by Kureha Kagaku Kogyo Co., Ltd.), 20% by weight of micro-granular activated carbon (300$\mu$ in an average diameter, made by Kureha Kagaku Kogyo Co., Ltd.), 40% by weight of a fine powdery precursor of carbon (Model M.H., 40$\mu$ in an average diameter, made by Kureha Kagaku Kogyo Co., Ltd.), and 20% by weight of phenol resin (Asahi Yukizai K.K.) was supplied onto the materials already placed in the metal mold.

Thus obtained mixture of materials supplied into the metal mold was press-molded under a pressure of 50 kg/cm$^2$ at a temperature of 140° C. for 30 minutes, and then the press-molded material was calcined at a temperature 800° C. for about 1 hour. After the compact carbonaceous layer of the electrode substrate calcined at the temperature of 800° C. was impregnated with liquid phenol resin obtained by dissolving phenol resin in ethyl alcohol, the impregnated layer was dried and the thus obtained material was further calcined at 800° C. The thus treatment of the impregnation thereto and pre-calcination thereof was repeated three times, and then the treated mixture of materials was calcined at 2000° C. for 1 hour to form the electrode substrate.

As seen from FIG. 3, the electrode substrate obtained by the procedure of Example 2 comprises two layers wherein the compact carbonaceous layer is very small in gas permeability thereof so as to be used also as a separator of a fuel cell. The physical properties of the electrode substrate wherein the shape of the cross-section of the elongated holes is substantially circular and the diameter thereof is about 0.8 mm are illustrated in Table 2.

TABLE 2

|  | Compact carbonaceous layer | Porous carbonaceous layer | Notice |
| --- | --- | --- | --- |
| Thickness (mm) | 0.5 | 1.5 |  |
| Bulk density (g/cm$^3$) | 1.47 | 0.58 | not including the part of elongated holes |
| Porosity (%) | 9 | 64 | the same as above |
| Gas permeability coefficient (ml/cm · hr · mmAq.) | 0.02 | 100 |  |
| Average diameter of micro-pores (micrometer) | — | 30 |  |
| Bending strength (kg/cm$^2$) | 240 | | as a whole electrode substrate |
| Electric resistance ($\Omega$cm) | 16 × 10$^{-3}$ | | the same as above |

EXAMPLE 3

In the same procedure as that of Example 2 except for using a carbon plate (made by Kureha Kagaku Kogyo Co., Ltd.) instead of the material for the compact carbonaceous layer, the electrode substrate comprising two layers according to the present invention was produced.

The physical properties of thus obtained electrode substrate wherein the shapes and diameter of the cross-section of the elongated holes are same as those of Example 2 are illustrated in Table 3.

TABLE 3

| | Compact carbonaceous layer | Porous carbonaceous layer | Notice |
| --- | --- | --- | --- |
| Thickness (mm) | 1.0 | 1.5 | |
| Bulk density (g/cm$^3$) | 1.8 | 0.58 | not including the part of elongated holes |
| Porosity (%) | below 1.0 | 64 | the same as above |
| Gas permeability coefficient (ml/cm · hr · mmAq.) | below 0.01 | 110 | |
| Average diameter of micro-pores (micrometer) | — | 30 | |
| Bending strength (kg/cm$^2$) | 280 | | as a whole electrode substrate |
| Electric resistance (Ωcm) | 14 × 10$^{-3}$ | | the same as above |

EXAMPLE 4

The electrode substrate comprising two layers according to the present invention was produced by the same procedure as that of Example 2 except for using a graphite sheet of 0.3 mm in thickness (Trademark of GRAFOIL ®, made by Union Carbide Corp.) instead of the material for the compact carbonaceous layer. The physical properties of thus obtained electrode substrate wherein the shape of the cross-section of the elongated holes is substantially circular and the diameter of the hole is about 0.8 mm are illustrated in Table 4.

TABLE 4

| | Compact carbonaceous layer | Porous carbonaceous layer | Notice |
| --- | --- | --- | --- |
| Thickness (mm) | 0.3 | 1.5 | |
| Bulk density (g/cm$^2$) | 1.12 | 0.58 | not including the part of elongated holes |
| Porosity (%) | — | 64 | the same as above |
| Gas permeability coefficient (ml/cm · hr · mmAq.) | below 0.01 | 115 | |
| Average diameter of micro-pores (micrometer) | — | 30 | |
| Bending strength (kg/cm$^2$) | 280 | | as a whole electrode substrate |
| Electric resistance (Ωcm) | 14 × 10$^{-3}$ | | the same as above |

EXAMPLE 5

Production of the Electrode Substrate Comprising Three Layers (1) The same mixture for producing the porous carbonaceous layer as that used in Example 2 was supplied into a metal mold for press-molding, and then (2) the material for forming elongated holes prepared in Example 1 (grating-like polypropylene molding), (3) the above mixture for producing the porous carbonaceous layer, (4) a carbon plate of 0.6 mm in thickness (made by Toyo Carbon K.K.), (5) the above mixture for producing the porous carbonaceous layer, (6) the above material for forming the elongated holes and (7) the mixture for producing the porous carbonaceous layer were supplied in the order onto the above mixture (1) already placed in the metal mold for press-molding. The mixture of the materials was press-molded under a pressure of 40 kg/cm$^2$ at 140° C. for 20 minutes. After the thus press-molded material was afterhardened at 140° C. for 2 hours, the thus hardened material was heated slowly up to 700° C. at a raising rate of 100° C./hour and was calcined at 2000° C. in an atmosphere of nitrogen gas for 1 hour to obtain the product.

The physical properties of the thus obtained electrode substrate comprising three layers wherein the shape of the cross-section of the elongated hole is substantially circular and the diameter of the hole is about 0.8 mm are illustrated in Table 5.

TABLE 5

| | Compact carbonaceous layer | Porous carbonaceous layer |
| --- | --- | --- |
| Thickness (mm) | 0.6 | 1.5 [3] |
| Bulk density [1] (g/cm$^3$) | 1.47 | 0.58 |
| Porosity [1] (%) | 9 | 64 |
| Gas permeability coefficient (ml/cm · hr · mmAq.) | 0.02 | 110 |
| Average diameter of micro-pores (micrometer) | — | 30 |
| Bending strength (kg/cm$^2$) | 250 [2] | |
| Electric resistance (Ωcm) | 10 × 10$^{-3}$ [2] | |

Note:
[1] Not including the part of the elongated holes.
[2] The value of a whole electrode substrate (refer to 11 in FIG. 4).
[3] The value of one layer designated by 8 in FIG. 4.

EXAMPLE 6

The electrode substrate comprising three layers was produced by the same procedure as that of Example 5 except for using a mixture comprising 20% by weight of short carbon fiber (Model M 104 S, made by Kureha Kagaku Kogyo Co., Ltd.), 20% by weight of microgranules of activated carbon (300 micrometer in an average diameter, made by Kureha Kagaku Kogyo Co., Ltd.), 40% by weight of a fine powdery precursor of carbon (40 micrometer in an average diameter, Model M.H., made by Kureha Kagaku Kogyo Co., Ltd.) and 20% by weight of phenol resin instead of the material used in Example 5.

The physical properties of the thus obtained electrode substrate are illustrated in Table 6.

TABLE 6

| | Compact carbonaceous layer | Porous carbonaceous layer |
| --- | --- | --- |
| Thickness (mm) | 0.6 | 1.5 [3] |
| Bulk density [1] (g/cm$^3$) | 1.47 | 0.58 |
| Porosity [1] (%) | 9 | 64 |
| Gas permeability coefficient (ml/cm · hr · mmAq.) | 0.02 | 110 |
| Average diameter of micro-pores (micrometer) | — | 30 |
| Bending strength (kg/cm$^2$) | 240 [2] | |
| Electric resistance (Ωcm) | 10 × 10$^{-3}$ [2] | |

Note:
[1] Not including the part of the elongated holes.
[2] The value of a whole electrode substrate.
[3] The value of one layer designated by 8 in FIG. 4.

EXAMPLE 7

The electrode substrate comprising three layers was produced by the same procedure as that of Example 5 except for using a graphite sheet of 0.3 mm in a diameter (GRAFOIL ®, made by Union Carbide Corp.) instead of the carbon plate used in Example 5.

The physical properties of the thus obtained electrode substrate wherein the shape of the cross-section of the elongated hole is substantially circular and the diameter of the hole is about 0.8 mm are illustrated in Table 7.

TABLE 7

|  | Compact carbonaceous layer | Porous carbonaceous layer |
| --- | --- | --- |
| Thickness (mm) | 0.3 | 1.5 [3] |
| Bulk density [1] (g/cm$^3$) | 1.12 | 0.58 |
| Porosity [1] (%) | — | 64 |
| Gas permeability coeffecient (ml/cm · hr · mmAq.) | below 0.01 | 115 |
| Average diameter of micro-pores (micrometer) | — | 30 |
| Bending strength (kg/cm$^2$) | 280 [2] | |
| Electric resistance (Ωcm) | 14 × 10$^{-3}$ [2] | |

Note:
[1] Not including the part of elongated holes.
[2] The value of a whole electrode substrate 11 in FIG. 4.
[3] The value of one layer designated by 8 in FIG. 4.

What is claimed is:

1. A process for producing a carbonaceous electrode substrate for use in fuel cells, comprising two layers of one porous carbonaceous layer and one compact carbonaceous layer or three layers of two porous carbonaceous layers and one compact carbonaceous layer disposed between said two porous carbonaceous layers, wherein said porous carbonaceous layer(s) has elongated holes located nearly in the central region of thickness of the each porous carbonaceous layer, characterized by using high polymeric substance as a material for forming said elongated holes.

2. A process according to claim 1, wherein said high polymeric substance does not volatilize nor shows any melt-flow at a temperature of 100° C.

3. A process according to claim 2, wherein said high polymeric substance is selected from the group consisting of polyethylene, polypropylene, polystyrene, polyvinylalcohol and polyvinylchloride and gives a carbonization yield of lower than 30% by weight.

4. A process according to claim 1, wherein said high polymeric substance for forming said elongated holes is a cloth-like fabric or a grating-like molding.

5. A process according to claim 4, wherein said cloth-like fabric has an equivalent diameter of 0.5 to 3.3 mm and is made by weaving single filaments of said high polymeric substance or bundles formed by tying a plurality of said single filaments.

6. A process according to claim 5, wherein the distance between the adjoining two single filaments or bundles of said cloth-like fabric is 1.5 to 5 mm in the direction parallel to the direction of a gaseous reactant flow in said electrode substrate when applied in a fuel cell, and is 1.5 to 50 mm in the direction perpendicular to said direction of said gaseous reactant flow.

7. A process according to claim 4, wherein said grating-like molding is prepared by extrusion molding said high polymeric substance in a molten state into a metal mold or is prepared by press-molding pellets or powder of said high polymeric substance in a metal mold so that the equivalent diameter of the cross-section of frames of said grating is 0.5 to 3.3 mm.

8. A process according to claim 7, wherein the distance between the adjoining two frames of said grating is 1.5 to 5 mm in the direction parallel to the direction of a gaseous reactant flow when applied in a fuel cell, and is 1.5 to 50 mm in the direction perpendicular to the direction of said gaseous reactant flow.

* * * * *

UNITED STATES PATENT AND TRADEMARK OFFICE
CERTIFICATE OF CORRECTION

PATENT NO. : 4,580,337
DATED : April 8, 1986
INVENTOR(S) : MASATOMO, Shigeta

It is certified that error appears in the above-identified patent and that said Letters Patent is hereby corrected as shown below:

Title page:

-- The Foreign Application Priority Data information on the Letters Patent is incorrect. It should read as follows:

59-55590    March 23, 1984  JAPAN
    59-55591    March 23, 1984  JAPAN

Not 57-55590    March 23, 1984  JAPAN
    57-55591    March 23, 1984  JAPAN --

Signed and Sealed this

Twenty-third Day of September 1986

[SEAL]

Attest:

DONALD J. QUIGG

Attesting Officer    Commissioner of Patents and Trademarks